(12) United States Patent
Shaffer et al.

(10) Patent No.: US 9,215,194 B2
(45) Date of Patent: Dec. 15, 2015

(54) METHOD AND APPARATUS TO PROCESS AN INCOMING MESSAGE

(71) Applicant: Cisco Technology, Inc., San Jose, CA (US)

(72) Inventors: Shmuel Shaffer, Palo Alto, CA (US); Alan D. Gatzke, Bainbridge Island, WA (US); Labhesh Patel, San Francisco, CA (US); Mukul Jain, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 122 days.

(21) Appl. No.: 13/942,764

(22) Filed: Jul. 16, 2013

(65) Prior Publication Data

US 2013/0301813 A1   Nov. 14, 2013

Related U.S. Application Data

(62) Division of application No. 11/237,081, filed on Sep. 28, 2005, now Pat. No. 8,503,624.

(51) Int. Cl.
*H04M 11/00* (2006.01)
*H04L 12/58* (2006.01)
(Continued)

(52) U.S. Cl.
CPC .............. *H04L 51/04* (2013.01); *G06Q 10/107* (2013.01); *H04M 1/72552* (2013.01); *H04M 3/53333* (2013.01); *H04M 3/4211* (2013.01); *H04M 3/537* (2013.01); *H04M 2201/18* (2013.01); *H04M 2203/301* (2013.01); *H04M 2203/4536* (2013.01); *H04M 2250/74* (2013.01)

(58) Field of Classification Search
USPC ........................................ 379/88.13, 100.08
See application file for complete search history.

(56) References Cited

U.S. PATENT DOCUMENTS 5,588,042 A   12/1996   Comer
6,035,017 A   3/2000   Fenton et al.
(Continued)

FOREIGN PATENT DOCUMENTS

DE   10338237 A1   3/2005
EP   1109390 A2   6/2001
(Continued)

OTHER PUBLICATIONS

"U.S. Appl. No. 11/237,081, Final Office Action mailed Dec. 29, 2011", 13 pgs.
(Continued)

*Primary Examiner* — Joseph T Phan

(57) ABSTRACT

A method and apparatus to process an incoming message is described. The method may comprise, at a recipient system, receiving an incoming message from a message communicator and automatically analyzing message content to identify a keyword included in the message content. Thereafter, a predefined action associated with the keyword may be identified and the action may be performed. In an example embodiment, the predefined action may be a priority with the message, alerting an intended recipient of the message, routing the message to the intended recipient, paging the intended recipient, emailing the message to the intended recipient, sending an SMS message to the intended recipient, or the like. In an example embodiment, a user/owner of a mailbox may search a message database to identify incoming messages which includes the search term in the message content.

16 Claims, 6 Drawing Sheets

(51) Int. Cl.
*G06Q 10/10* (2012.01)
*H04M 1/725* (2006.01)
*H04M 3/533* (2006.01)
*H04M 3/42* (2006.01)
*H04M 3/537* (2006.01)

(56) References Cited

U.S. PATENT DOCUMENTS

| | | | |
|---|---|---|---|
| 6,226,670 B1 * | 5/2001 | Ueno et al. | 709/207 |
| 6,313,734 B1 | 11/2001 | Weiss et al. | |
| 6,507,865 B1 * | 1/2003 | Hanson et al. | 705/36 R |
| 6,687,339 B2 | 2/2004 | Martin | |
| 6,727,930 B2 * | 4/2004 | Currans et al. | 715/864 |
| 6,769,002 B2 * | 7/2004 | Ayan | |
| 6,781,962 B1 | 8/2004 | Williams et al. | |
| 6,941,304 B2 * | 9/2005 | Gainey et al. | |
| 7,032,030 B1 | 4/2006 | Codignotto | |
| 7,130,885 B2 * | 10/2006 | Chandra et al. | 709/206 |
| 7,379,872 B2 | 5/2008 | Cabezas et al. | |
| 7,617,042 B2 | 11/2009 | Horvitz et al. | |
| 7,685,102 B2 | 3/2010 | Adelman et al. | |
| 7,693,267 B2 | 4/2010 | Howell et al. | |
| 7,769,001 B2 | 8/2010 | Narasimhan et al. | |
| 8,064,576 B2 | 11/2011 | Skakkebaek et al. | |
| 8,407,786 B1 * | 3/2013 | Elias et al. | 726/22 |
| 8,503,624 B2 | 8/2013 | Shaffer et al. | |
| 8,510,389 B1 * | 8/2013 | Gurajada et al. | 709/206 |
| 8,645,473 B1 * | 2/2014 | Spitkovsky | 709/206 |
| 8,738,611 B1 * | 5/2014 | Zarmer et al. | 707/723 |
| 2002/0103867 A1 | 8/2002 | Schilter | |
| 2002/0131399 A1 * | 9/2002 | Philonenko | 370/351 |
| 2003/0028380 A1 | 2/2003 | Freeland et al. | |
| 2003/0185383 A1 * | 10/2003 | Bergsagel | 379/387.01 |
| 2003/0220784 A1 | 11/2003 | Fellenstein et al. | |
| 2004/0252679 A1 | 12/2004 | Williams et al. | |
| 2005/0055213 A1 | 3/2005 | Claudatos et al. | |
| 2007/0081636 A1 | 4/2007 | Shaffer et al. | |

FOREIGN PATENT DOCUMENTS

| | | |
|---|---|---|
| WO | WO-2007037875 A2 | 4/2007 |
| WO | WO-2007037875 A3 | 4/2009 |

OTHER PUBLICATIONS

"U.S. Appl. No. 11/237,081, Non-Final Office Action mailed Mar. 11, 2010", 10 pgs.

"U.S. Appl. No. 11/237,081, Notice of Allowance mailed Apr. 1, 2013", 8 pgs.

"U.S. Appl. No. 11/237,081, Response filed Jul. 12, 2010 to Non Final Office Action mailed Mar. 11, 2010", 13 pgs.

"European Application Serial No. 06813809.8, Extended European Search Report mailed Sep. 16, 2010", 8 Pgs.

"European Application Serial No. 06813809.8, Response filed Apr. 4, 2011 to the Communication pursuant to Article 70(2) and 70a(2) mailed Sep. 16, 2010", 19 pgs.

"International application Serial No. PCT/US06/33387, International Preliminary Report on Patentability mailed Mar. 10, 2009", 6 pgs.

"International application Serial No. PCT/US06/33387, International Search Report mailed May 2, 2008", 5 pgs.

"International application Serial No. PCT/US06/33387, Written Opinion mailed May 2, 2008", 5 pgs.

"Method for Enhanced Messaging Service", IBM Technical Disclosure Bulletin vol. 36, No. 8, XP000390273 ISSN:0018-8689, (Aug. 1, 1993), 405-407.

* cited by examiner

METHOD AND APPARATUS TO PROCESS AN INCOMING MESSAGE

RELATED APPLICATION

This application is a divisional application of, and claims the benefit of priority to U.S. patent application Ser. No. 11/237,081, filed Sep. 28, 2005, which is incorporated by reference herein in its entirety.

TECHNICAL FIELD

This application relates to a method and apparatus to process and incoming message. In an example embodiment, the method and apparatus may process an incoming voice message in a telephone communication system.

BACKGROUND

Voice mail systems are well known in the art. Currently, a sender of a voice mail message may set the priority of the message. Likewise, a sender of an email message may set the priority of the email message (e.g., flag the importance of the email message as "Low," "Medium," and "High"). However, a recipient of the message may not consider the message to be of the same importance as the sender.

In order to identify the importance defined by the sender, a mail message may include an indicator in an envelope that is communicated from a sender device to a recipient device. Typically, included in the envelope are various separate fields such as a routing information field, a message importance field, a payload field that includes the payload or actual message content, and the like.

BRIEF DESCRIPTION OF DRAWINGS

Embodiments of the present invention are illustrated by way of example and not limitation in the figures of the accompanying drawings, in which like references indicate similar elements and in which.

DETAILED DESCRIPTION

In an example embodiment, a method and a system to process an incoming message received via a communication network is described.

Figure 1:
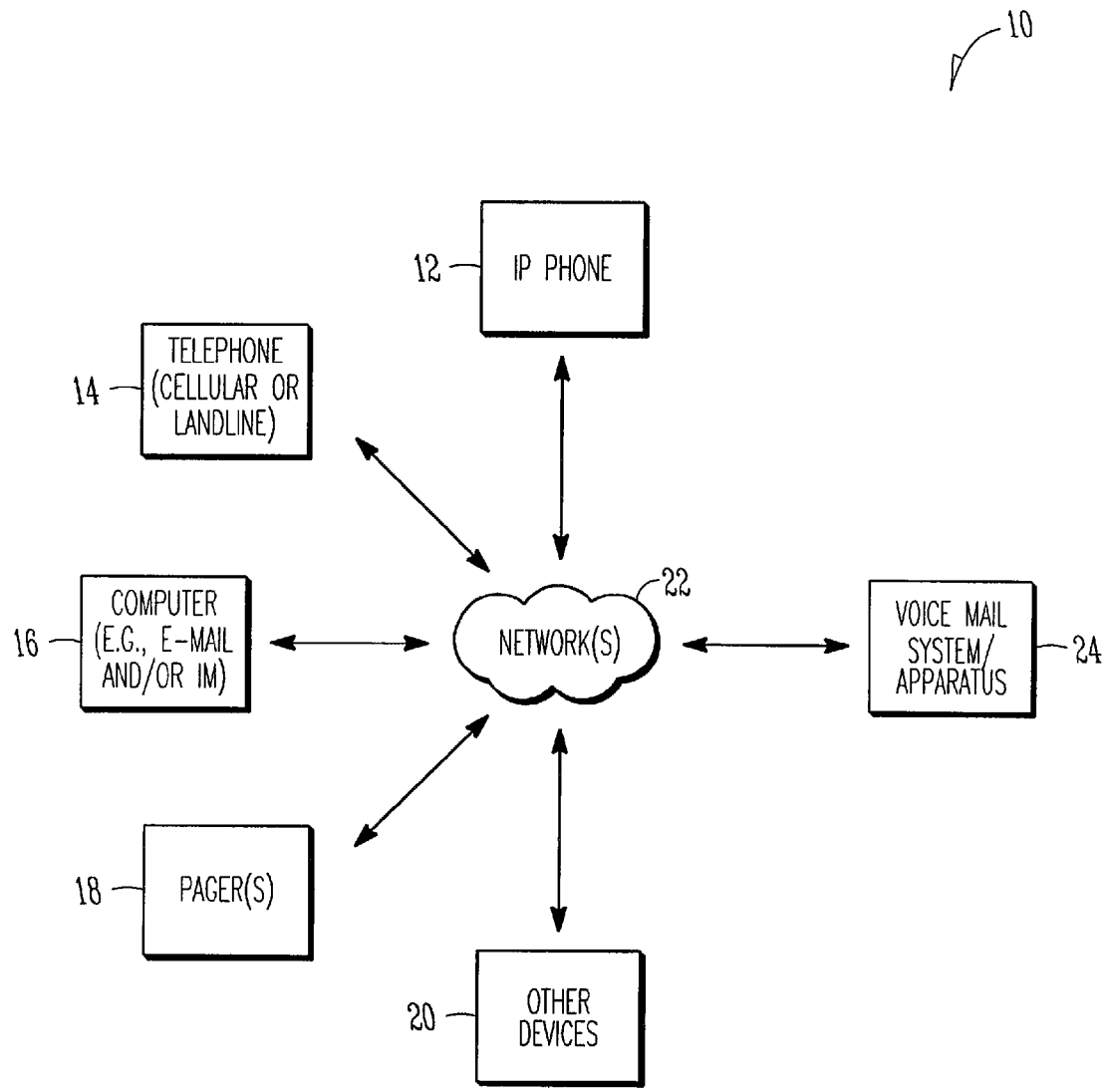
FIG. 1 shows architecture of a system, in accordance with the an example embodiment, to process electronic messages.

In the following detailed description of example embodiments, reference is made to the accompanying drawings which form a part hereof, and in which is shown by way of illustration specific embodiments in which the example method, apparatus and system may be practiced. It is to be understood that other embodiments may be utilized and structural changes may be made without departing from the scope of this description. FIG. 1 shows architecture of a system 10, in accordance with an example embodiment, to process incoming messages. For example, the system 10 may be used to process voice mail messages, Instant Messages (IM), email messages, or the like sent via any communication network. However, unlike prior art systems, incoming messages in the system 10 are processed based on the message content included within the incoming message. For example, the term "incoming message" may define the entire communication package communicated between a sender and a recipient and may comprise an envelope which includes a plurality of separate message fields. For example, a message field may be provided for routing information, a message field may be provided for a priority indicator, a message field may be provided for a payload, or the like. The field provided for the payload typically includes the actual voice or text message herein referred to as the message content. Thus, the message content may be the actual text which a sender communicates to a recipient, the actual voice or speech data communicated to the recipient, or the like. Thus, in an embodiment, the message content may thus be the actual linguistic communication, written or spoken, which the sender wishes to convey to the recipient. The message content may thus form part of a total communication or envelope communicated between a sending device and a receiving device.

The system 10 is shown to include a Voice over Internet Protocol (VoIP) phone 12, a telephone 14 (which may be a cellular telephone, a wired or landline telephone, or the like), a computer 16 (e.g. a personal computer including an email and/or Instant Message client), a pager 18, or any other device 20 capable of communicating messages from a sender to a recipient. The devices 12 to 20, may communicate via one or more networks 22 with a voice mail system or apparatus 24. Unlike prior art systems where the importance of an incoming message is defined by a sender, in the system 10, the voice mail apparatus 24 may define the importance or any action to be performed on an incoming message. The action performed on the incoming message may thus be independent of any priority or importance attached to the incoming message by a sender. Further, unlike prior art systems where any importance attached by the sender to the message is by virtue of a flag that is not derived in any way from the message content, the voice mail system 24 analyses the message content of an incoming message in an automated fashion, and without human intervention, to identify a keyword (or keywords) included in the message content. Thereafter, as described in more detail below, a predefined action (or actions) associated with the keyword may be automatically identified and the action may be automatically performed or executed when the keyword is identified in the message content.

As a predefined action (e.g. attaching an importance to an incoming message) may be identified from the actual message content when the incoming message is received at the recipient, it may be performed in an automated fashion without further interaction with a user. Thus, the system 10 differs from prior art call center configurations where a user may be required to identify the importance of an incoming message via Interactive Voice Recognition (IVR) technology. However, it will still be appreciated that it is in this prior art case the sender defines the priority of the message and that such a priority may not correspond to the priority attached to the message by the recipient. Further, such priority is attached to the message in general and is not dependent or automatically derived, without human intervention, from the actual message content of a message which is communicated from a sender to a recipient.

It will be appreciated that the system 10 shown in FIG. 1 may include a plurality of different devices and that the devices shown in FIG. 1 are merely by way of example. Thus, it will be appreciated that any mobile telephone device connected to a mobile telephone network may interface with the voice mail apparatus 24. Likewise, any traditional circuit transmissions of a Plain Old Telephone Service (POTS) or VoIP phone system may interface with the voice mail apparatus 24. Thus the one or more networks 22 may include a Local Area Network (LAN), Wide Area Network (WAN), or the Internet and, accordingly, any computer or computing device may also communicate with the voice mail apparatus 24 via the Internet.

Figure 2:
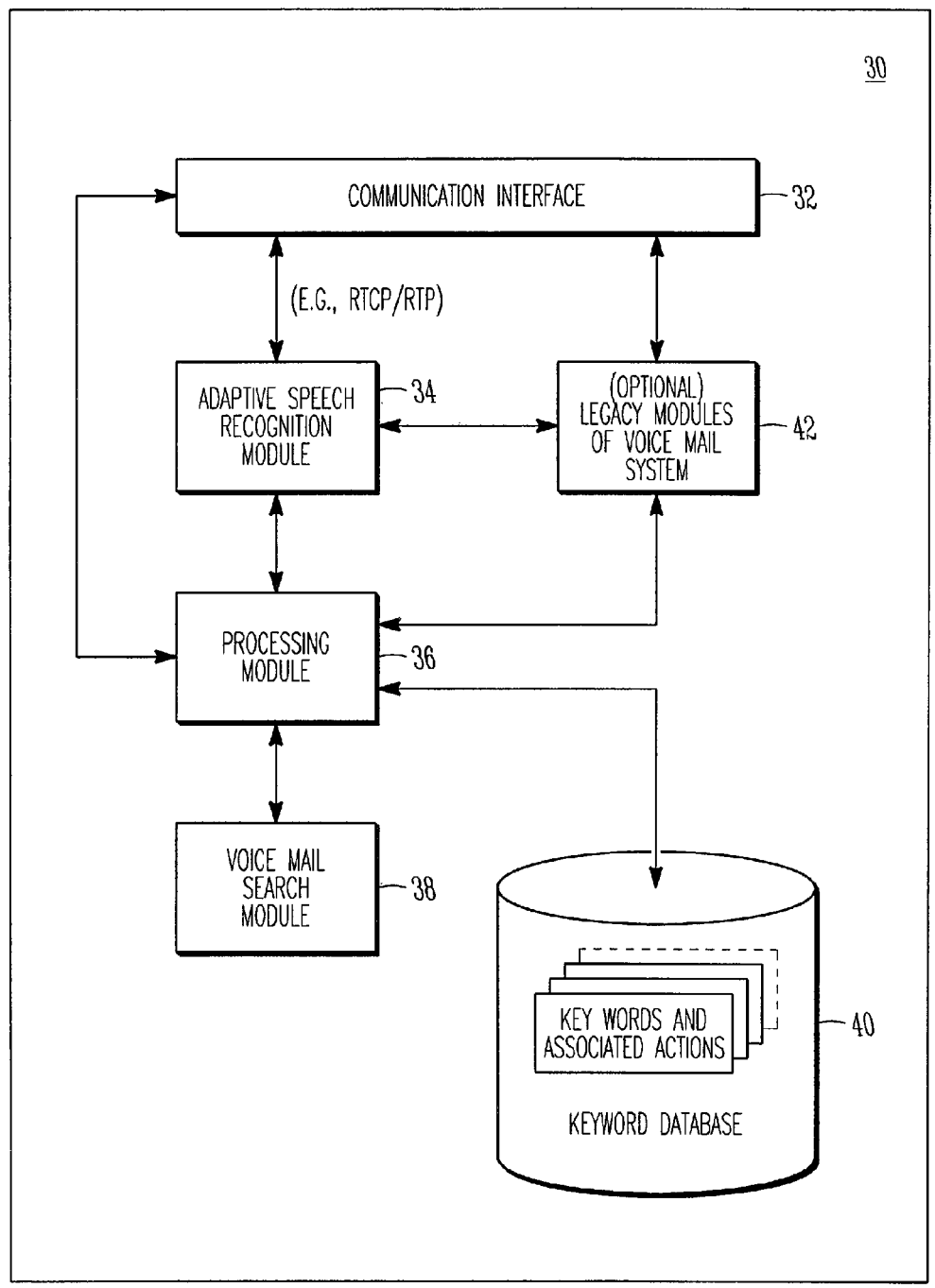
FIG. 2 shows a block diagram of apparatus, in accordance with an example embodiment, to process an incoming message.

FIG. 2 shows block diagram of apparatus, in accordance with an example embodiment, to process incoming messages. The apparatus of FIG. 2 may form part of the system 10 and is described herein, by way of example, with reference to the system 10.

Figure 3:
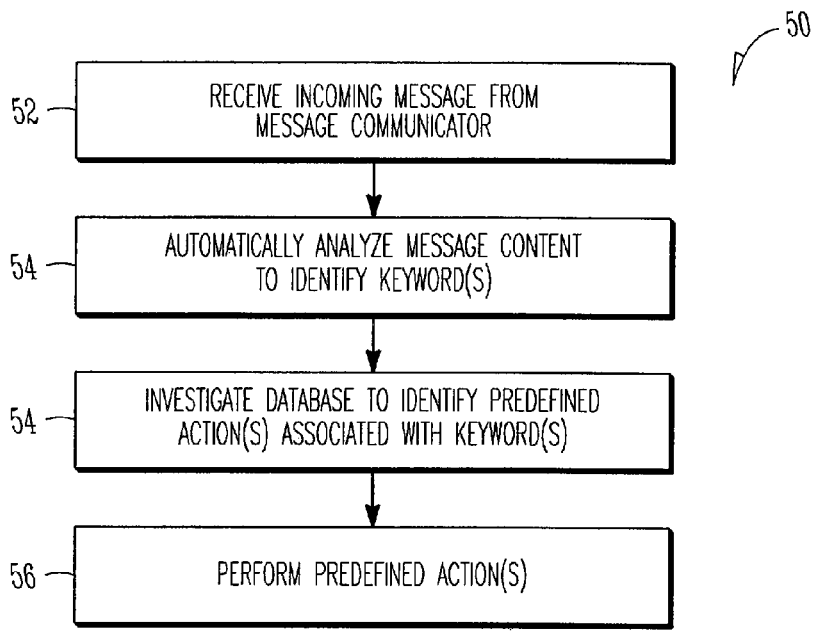
FIG. 3 shows a flow diagram of a method, in accordance with an example embodiment, of processing an incoming message.

The apparatus 30 is shown to include a communication interface 32, an Adaptive Speech Recognition (ASR) module 34, a processing module 36, an optional voice mail search module 38, a keyword database 40, and optional legacy modules of a voice mail system 42. The communication interface 32 may interface the apparatus 30 to any one or more of the devices 12 to 20 via any one or more networks 22 as shown in FIG. 1. It will be appreciated that any of the modules of the apparatus 30 may be implemented in hardware or software. Although the system and apparatus is described with reference to ASR and keywords (hot words), it should be understood by inclusion that throughout this document that the reference to ASR is interchangeable with natural language recognition (or any other speech recognition technology) and the keywords (hot words) may constitute a phrase that is then recognized Referring to FIG. 3, reference 50 generally indicates a flow diagram of a method, in accordance with an example embodiment, of processing an incoming message. The method 50 may be performed by the apparatus 30 and, accordingly, is described herein with reference thereto. As shown at block 52, an incoming message may be received from a message communicator or sender at the communication interface 32. The communication interface 32 may then communicate the incoming message (e.g. a Real Time Transport Protocol (RTP Control Protocol or RTCP)) to the Adaptive Speech Recognition module 34. Prior to performing speech recognition, the actual message content (e.g. the actual voice or speech message communicated by the sender) may then be extracted from the total message incoming message. Thus, in an embodiment, incoming audio message content (in digital or analog form) is processed or transformed into a textual equivalent of the message. It is however to be appreciated that the invention is not limited to algorithms that convert the keywords (hot words) into text. In certain embodiments, the system may work directly from audio phrases without the conversion to text. Thus, identification of one or more keywords (e.g., forming a phrase) may be performed in the audio domain where a voice message is analyzed to identify one or more keywords. Based on processing in the audio domain, one or more actions may be executed.

Thereafter, as shown in block 54, the processing module 36 may automatically analyze the message content to identify if one or more keywords exist in the textual equivalent of the message content. The keywords, or "hot words", may be provided in the keyword database 40 (e.g. in an XML format). Each keyword may have one or more predefined actions associated therewith. For example, a particular keyword may have an action such as associating a priority with the incoming message, alerting an intended recipient (e.g. the mailbox owner) of the incoming message, routing the incoming message to the intended recipient, paging the intended recipient, emailing the incoming message to the intended recipient, sending an SMS message to the intended recipient, or any other user defined action. Thus, as shown at block 54, the method 50 may investigate or interrogate the keyword database 40 to initially identify which keywords are to be searched for in the incoming message and, if a particular keyword is found, identify the predefined action or actions associated with the keyword. Thereafter, as shown at block 56 the predefined action may be performed or executed. Thus, the apparatus 30 may define a content sensitive voice mail system where a recipient of a voice mail defines an action dependent upon the content of the voice mail. Similarly, natural speech recognition may be used to identify phrases.

In an example embodiment, the apparatus 30 may be language sensitive or provide a facility to define more than one language associated with the keywords. For example, the apparatus 30 may identify a source of an incoming message (e.g. a source of an incoming telephone call) and associate a particular language with the source of the incoming message. For example, if it is determined from caller identification information that the incoming message is a voice message from a person in France, then a French language profile, including French keywords, may be retrieved from the database 40. In an example embodiment, a user may be prompted to identify which particular language they are communicating the message in.

The apparatus 30 may, for example, form part of a voice mail system of a medical clinic or medical doctor. For example, a doctor may define keywords relating to a particular patient and/or particular medical condition. In addition, the doctor may then define actions to be performed when a voice mail is received including the keywords. For example, the doctor may define a patient's name (e.g. "Jones") and a health condition (e.g. "heart") as keywords. Further, an action such as automatically forwarding a call to the doctor's mobile telephone or automatically attaching a high priority to the call may be associated with the keywords. Accordingly, if Mr. Jones were to call and indicate in his voice mail that he was Mr. Jones and that he had a heart condition, the apparatus 30 would automatically identify these words in the voice message, and perform the actions defined by the doctor. Thus, in the present example, the call or message would be either marked as a high priority message or immediately forwarded to the doctor's mobile telephone. It will, however, be appreciated that the keywords and the associated actions may vary from one deployment of the apparatus 30 to another. Further, the apparatus 30 is not restricted to processing only stored messages and may process and incoming message (e.g., an incoming telephone call) on-the-fly or in real time. Thus, in an example embodiment, an incoming telephone call may be processed while the caller is speaking.

Figure 4:
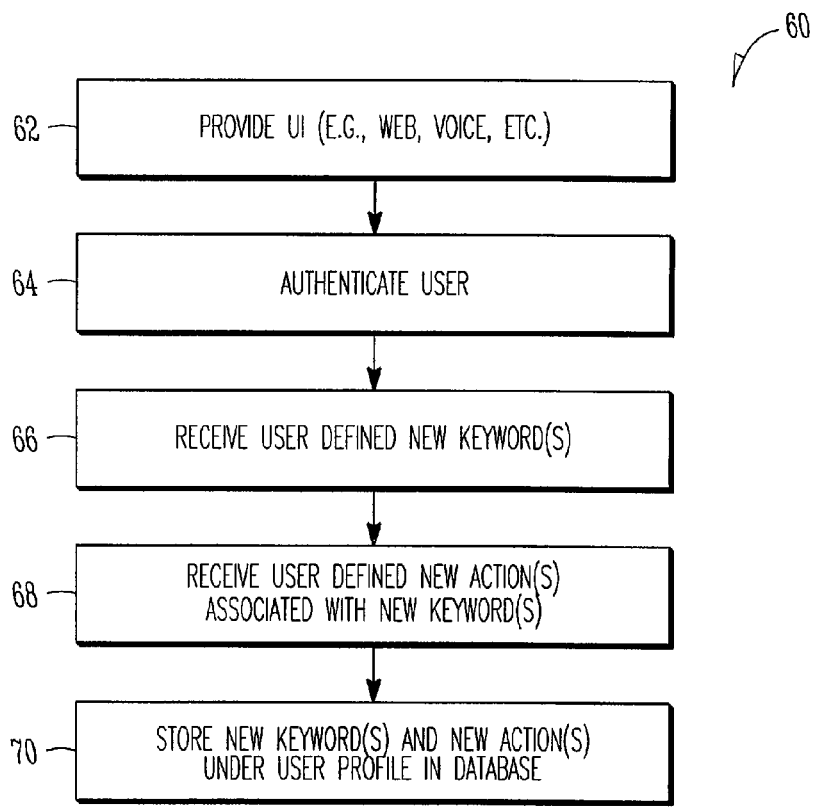
FIG. 4 shows a flow diagram of a method, in accordance with an example embodiment, to allow a user to define keywords and associated actions.

FIG. 4 shows a flow diagram of the method, in accordance with an example embodiment, that allows a user to define keywords and their associated actions. As shown at block 62, a user interface may be provided by, for example, the apparatus 30. The user interface may, for example, be a web interface, a voice interface where a user dials into the apparatus 30, or any other interface wherein keywords and associated actions can be communicated to the apparatus 30 by a user (e.g., a mailbox owner). In an example embodiment, preprogrammed keywords and/or actions may be provided in the database 40 of the apparatus 30. Thus, for example, a user may then select any one or more of the preprogrammed keywords and their associated actions. Further, it will be appreciated that a user may define their own proprietary actions that may be associated with each keyword.

In method 60, as shown at block 64, a user may be authenticated prior to allowing the user access to a user specific profile of keywords and associated predefined actions. Once the user has been authenticated, the apparatus 30 may receive new keywords that the user has defined and/or selected (see block 66) and, thereafter, the apparatus 30 may receive new actions that have been defined by the user and which are associated with the new keywords (see block 68). As shown at block 70, the new keywords and new actions may then be stored (e.g. in the database 40). In an embodiment, multiple users may be associated with the apparatus 30 and, accordingly, each user may have a user profile that allows customization of keywords and predefined actions for the particular user. It will be however be appreciated that certain keywords and actions may be common to all users. As mentioned above, it will be appreciated that the user interface that allows the user to define new keywords and actions may use any communication medium (e.g. an email communication, a voice mail communication, an Instant Message communication, web interface via a browser, or the like).

In an example embodiment, a user may dial into the apparatus 30, which may form part of a voice mail system, and, upon authentication, may be presented with a Telephone User Interface (TUI) menu. For example, the telephone user interface menu may prompt the user with the following audio instructions: "to listen to your voice mail messages, please press 1; to set your personal preferences, please press 2, and so on." A user may then select the personal preferences option and be presented with a relevant menu such as: "to change your outgoing message, please press 1, to set your keywords, please press 2, to set actions associated with keywords, please press 3, and so on". The user may then choose the keywords or hot words option and record a sequence of keywords which are then stored in a personal profile and associated with the user's mailbox. In an embodiment, the user may utilize natural language capabilities of the apparatus 30 and instruct the apparatus 30 via a spoken sentence. For example, after authentication, the user may hear a short prompt such as: "please specify your command". In response, the user may say "please configure my three keywords to be 'word 1', 'word 2', and 'word 3'." Following on the example above, with respect to a medical practice, the user may command the apparatus 30 as follows: "please configure my three keywords to be 'Jones', 'heart', and 'statuses.'" The apparatus 30 may then play back to a caller (in the present example a doctor associated with the mailbox) a confirmation message such as: "you have asked to configure three keywords: 'Jones', 'heart', and 'statuses. If this is correct please acknowledge or say 'modify'." Once the user acknowledges that the system or apparatus has properly recorded the three keywords, the keywords may then be stored in the user's personal profile in the database 40 and associated with their mailbox.

In an embodiment, the apparatus 30 allows the user to program actions or rules for the keywords. For example, the user may mark as urgent any call from a particular caller that includes the words "dinner" and "at". For example, returning to the medical example, any messages that include the keywords "blood test results" may be marked as urgent. In an example embodiment, caller identification may also be used in conjunction with the keywords to perform a particular predefined action. In one example deployment of the apparatus 30, when an incoming call is redirected to a voice mail system, the adaptive speech recognition module 34 may be conferenced in to a voice path of a voice mail system. Further, the apparatus 30 may then dynamically load corresponding keywords to speech recognition from the associated personal profile. Thus, different users of the apparatus 30 may have customized personal profiles each including hot words or keywords that they have defined and that are relevant to them.

In an embodiment, if the message content of an incoming call or message includes any one or more of the keywords, the voice mail apparatus 30 may mark the message as urgent, or as of high priority. In addition or instead, the apparatus 30 may call the recipient user on an alternative (e.g. a home or cellular) telephone number and inform the recipient user of the high priority call or transfer the call to the alternative telephone number. In an embodiment, the apparatus 30 may intermittently or periodically call alternative numbers or alert the user to a high priority message via e-page, SMS, Instant Messaging (IM), or the like. Thus, the apparatus 30 allows a user of a voice mail apparatus to define keywords and, in an embodiment, to associate or compare the keywords against a preprogrammed set of user specific rules or actions. As soon as a rule or action is matched, the apparatus may mark the call as urgent or high priority and act in accordance with the preprogrammed or predefined action or plan.

Figure 5:
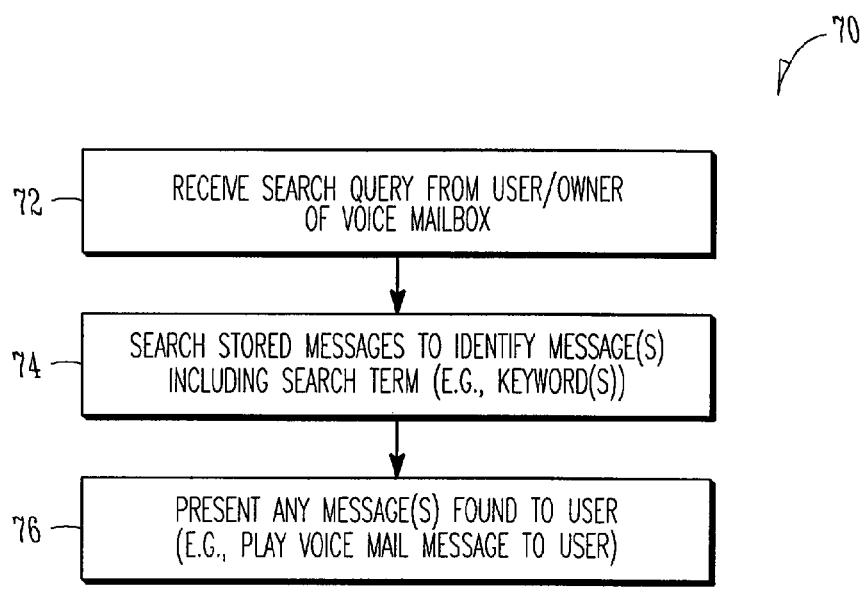
FIG. 5 shows a flow diagram of a method, in accordance with an example embodiment, of searching a plurality of stored messages using keywords.

As shown in FIG. 2, in one example embodiment, the apparatus 30 includes a voice mail search module 38 that allows a user to search his or her voice mail messages to identify one or more incoming messages that include a corresponding keyword in the message content. The search module 38 is described by way of example with reference to a method, in accordance with an example embodiment, shown in FIG. 5.

The method 70 is shown at block 72 to receive a search query from a user/owner of a voice mail box that includes one or more keywords. Thereafter, as shown at block 74, a database of stored messages may be searched to identify messages including one or more of the search terms or keywords. For example, the database 40 may be searched utilizing the voice mail search module 38. Returning to the medical doctor example, a doctor may call in to the apparatus 30 and via a search interface, search all his or her email messages for the words "Jones" and "heart". In this given example, the voice mail search module 38 may then search all the voice mail messages associated with the doctor's profile and return or playback those messages that include the search terms or keywords. Thus, the voice mail search module 38 may facilitate identifying voice mail messages of high priority or of a particular concern to the user and identify them from a plurality of other voice mail messages which may be less relevant. It will, however, be appreciated to a person of skill in the art that the search functionality may also be used to search email messages, instant messages, or the like.

In an embodiment, the method 70 receives a voice query including a spoken search term and performs speech recognition on the spoken search term to obtain an equivalent textual search term. Thereafter, the database of incoming messages is searched using the textual equivalent search term to identify any incoming messages including the spoken search term. In addition or instead, the method 70 may receive a textual query including a textual search term and search the database of incoming messages with the textual search term to identify any incoming messages including the textual search term. In an embodiment, methods described herein may identify the phrases without the need to convert the keywords (hot words) into text but perform the analysis in the audio domain.

When one or more keywords have been identified in one or more messages, those messages that have been found are then presented to the user (see block 76). For example, the message(s) including the keyword(s) may be played back to the user in a similar fashion to a conventional voice mail message. In an embodiment, the search is performed in the audio domain.

Figure 6:
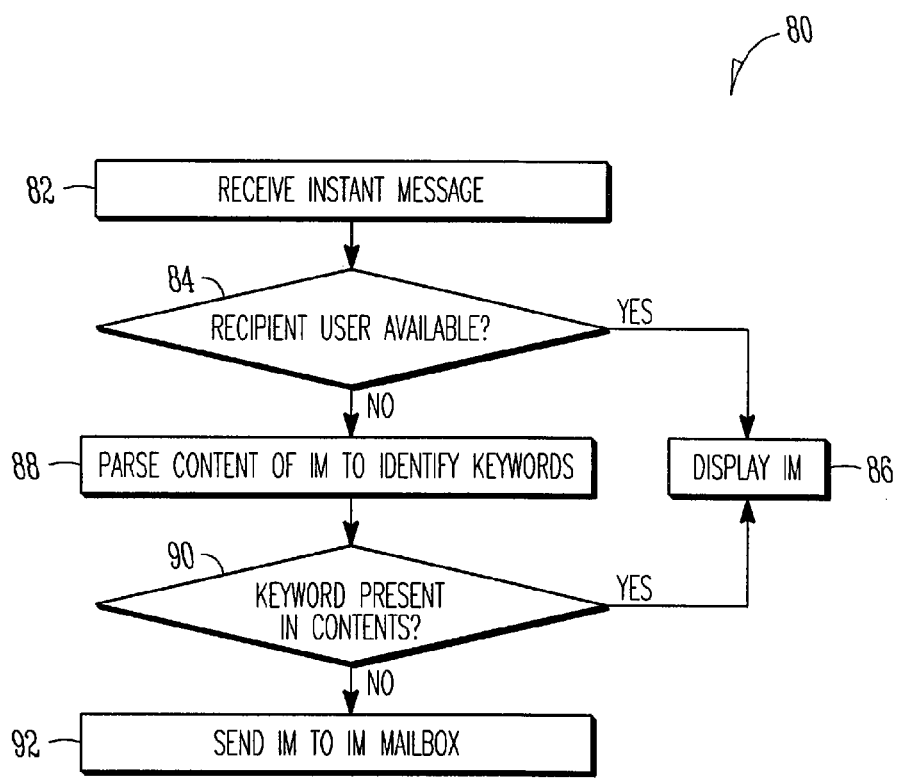
FIG. 6 shows a flow diagram of a method, in accordance with an example embodiment, of processing an Instant Message received at an Instant Message client.

Referring to FIG. 6, reference 80 generally indicates a flow diagram of a method, in accordance with an example embodiment, for processing an incoming instant message. Unlike current instant messaging systems, where an incoming instant message is either displayed or not displayed dependent upon whether the recipient user has defined himself or herself as available or not, the method 80 allows a user to define various states of an instant messaging client dependent upon the message content of the instant message. As described above, one or more predefined actions or rules may be associated with keywords and, when the keywords are present in the message content of the instant message, the predefined action may be performed. In an example embodiment, the predefined action may be defining a state of the instant messaging client. Thus, other than an available or not available state which determines whether or not an email message is displayed to the user, the action may define another state in which the email message is communicated to the user based on the message content.

As shown at block 82, an instant message may be received where after, as shown at decision block 84, a determination is made as to whether or not the recipient user is available. If the recipient user is available then the incoming instant message is immediately displayed to the user as shown at block 86. If, however, the recipient user has defined or indicated in the instant messaging client that he or she is not available, then the method 80 may parse or analyze the instant message content to identify whether or not any user defined keywords are present (see block 88). As shown at decision block 90, if a keyword is present in the instant message content, the method 80 may then display the instant message to the user as shown at block 86. If, however, the keyword is not present in the instant message content, the method 80 may send the instant message to an instant message mailbox. Thus, a user may define whether or not an instant message is displayed or not dependent upon the content of the instant message.

Figure 7:
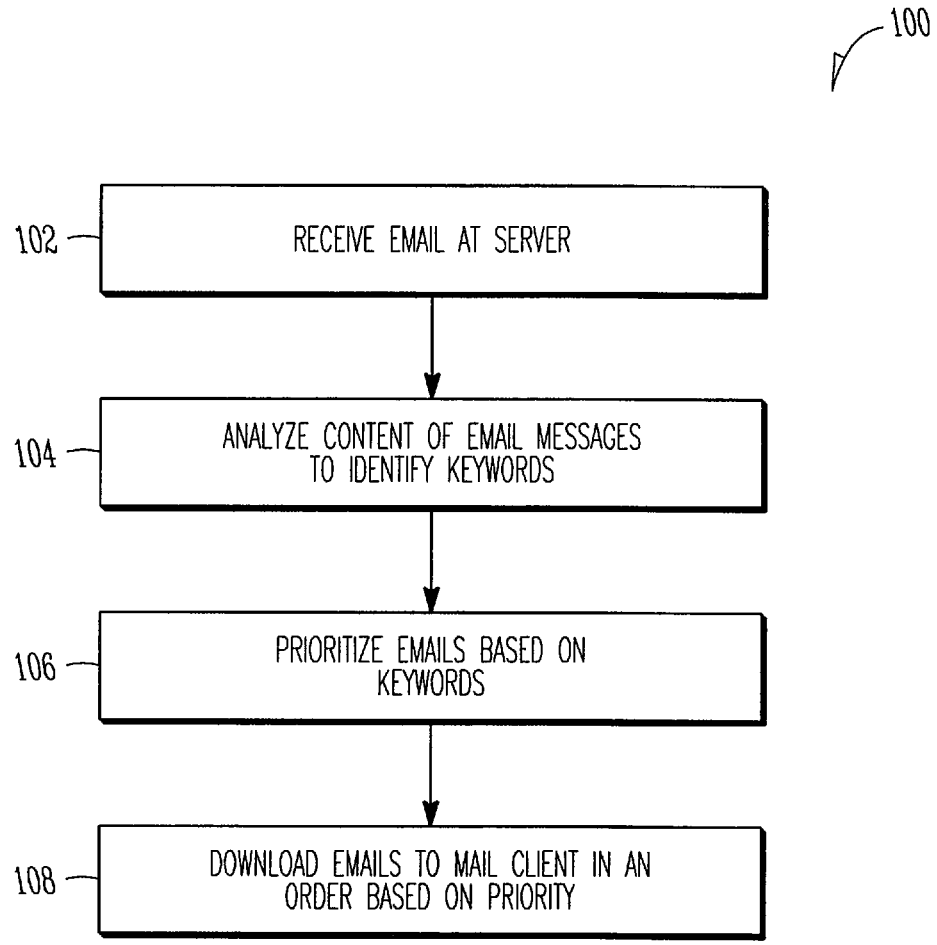
FIG. 7 shows a flow diagram of a method, in accordance with an example embodiment, of processing a plurality of email messages to define an order in which they are downloaded to a mail client.

Referring in particular to FIG. 7, reference 100 shows a flow diagram of a method, in accordance with an example embodiment, to prioritize emails and, in response to the prioritization, download the emails in a specific order to a mail client. Accordingly, as shown at block 102, the method may receive an email at an email server. Thereafter, the method 100 analyzes the message content of the email message to identify if the message includes any particular keywords (see block 104). The keywords may, as hereinbefore described, be associated with an action which, in an example embodiment, is a prioritization of the email. Thus, as shown at block 106, dependent on whether or not a particular keyword (or keywords) is included in the message content of the email, the email may be prioritized for downloading. Further, the downloading priority may be dependent upon the specific keyword or keywords included in the email message content. For example, if a large number of emails are to be downloaded from an email server to a client device (e.g. a laptop computer or the like), those emails with a higher priority may be downloaded before those emails with a lower priority. In the method 100, the priority of the email may be determined by the recipient of the email as the recipient may define the keywords which, in turn, determine the priority of the email, unlike the prior art systems where the sender defines the priority by setting an indicator, for example, as higher medium and low. Thus, as shown at block 108, when the emails are downloaded from a mail server, they are downloaded in an order of importance defined by the recipient and not by the sender.

Figure 8:
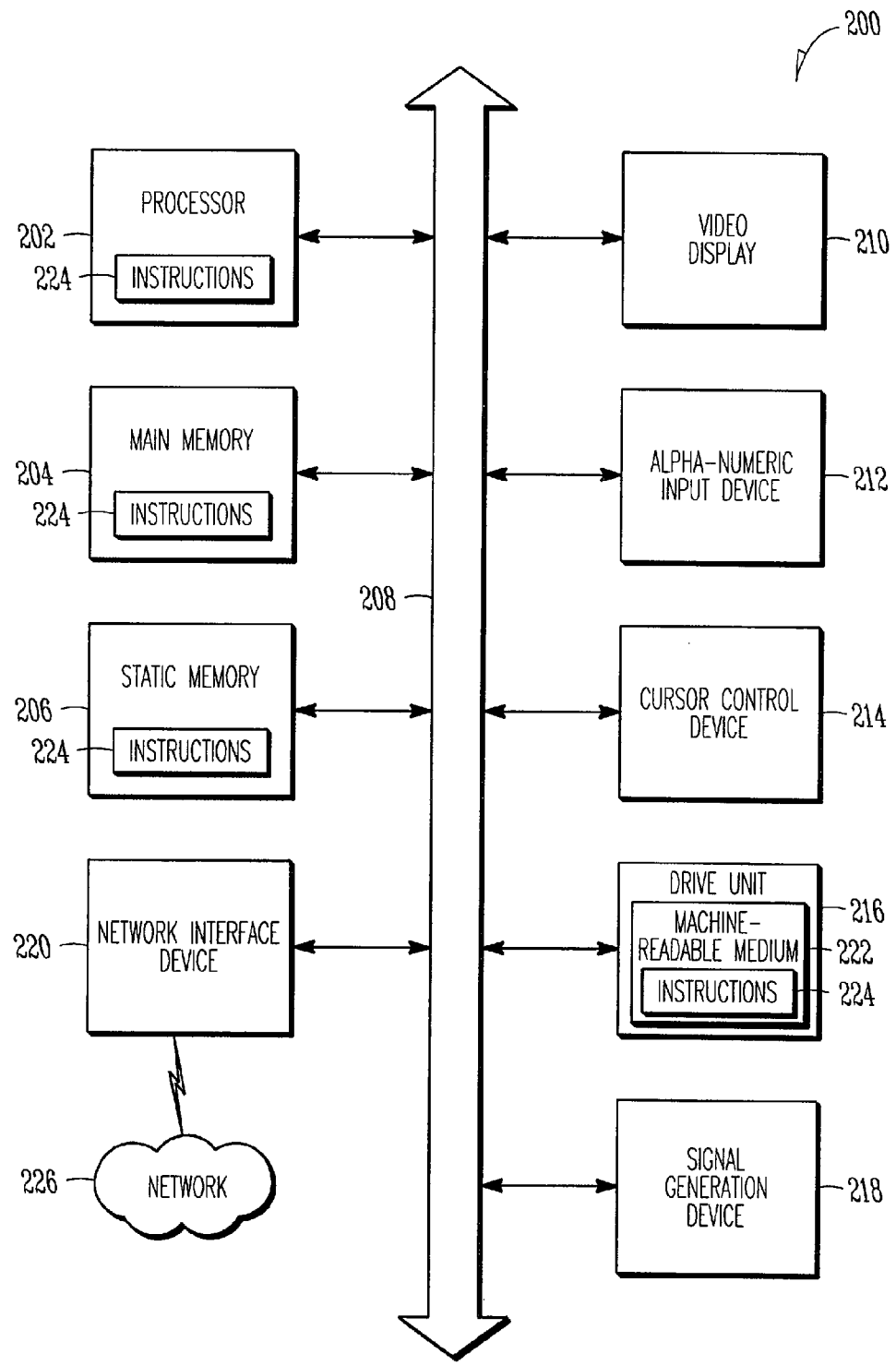
FIG. 8 shows a block diagram of a machine including instructions to perform any one or more of the methodologies described herein.

FIG. 8 shows a diagrammatic representation of machine in the example form of a computer system 200 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a voice mail system, a cellular telephone, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 200 includes a processor 202 (e.g., a central processing unit (CPU), a graphics processing unit (GPU) or both), a main memory 204 and a static memory 206, which communicate with each other via a bus 208. The computer system 200 may further include a video display unit 210 (e.g., a liquid crystal display (LCD) or a cathode ray tube (CRT)). The computer system 200 also includes an alphanumeric input device 212 (e.g., a keyboard), optionally a user interface (UI) navigation device 214 (e.g., a mouse), optionally a disk drive unit 216, a signal generation device 218 (e.g., a speaker) and a network interface device 220.

The disk drive unit 216 includes a machine-readable medium 222 on which is stored one or more sets of instructions and data structures (e.g., software 224) embodying or utilized by any one or more of the methodologies or functions described herein. The software 224 may also reside, completely or at least partially, within the main memory 204 and/or within the processor 202 during execution thereof by the computer system 200, the main memory 204 and the processor 202 also constituting machine-readable media.

The software 224 may further be transmitted or received over a network 226 via the network interface device 220 utilizing any one of a number of well-known transfer protocols (e.g., HTTP).

While the machine-readable medium 222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Such medium may also include, without limitation, hard disks, floppy disks, flash memory cards, digital video disks, random access memory (RAM), read only memory (ROMs), and the like.

The embodiments described herein may be implemented in an operating environment comprising software installed on any programmable device, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A method comprising:
at a recipient system,
presenting a keyword user interface to a recipient user;
receiving a new keyword from the recipient user via the keyword user interface;
receiving a new action associated with the new keyword, from the recipient user;
storing the new keyword and the new action in a profile associated with the recipient user;
receiving a plurality of incoming email messages from a message communicator, each email message of the plurality of incoming email messages including message content;
automatically analyzing the message content of each email message to identify at least one keyword of a set of keywords that includes the new keyword, wherein the at least one keyword is included in the message content;
prioritizing the plurality of incoming email messages based on the at least one keyword to identify a download priority associated with each email message; and
selectively downloading an email message with a higher priority before downloading an email message with a lower priority.

2. A non-transitory machine-readable storage medium embodying instructions which, when executed by a machine, causes cause the machine to perform the method of claim 1.

3. A method comprising:
at a recipient system,
presenting a keyword user interface to a recipient user;
receiving a new keyword from the recipient user via the keyword user interface;
receiving a new action associated with the new keyword, from the recipient user;
storing the new keyword and the new action in a profile associated with the recipient user;
receiving an Instant Message from a message communicator, the Instant Message including instant message content;
automatically analyzing the instant message content of the Instant Message to identify at least one keyword of a set of keywords that includes the new keyword, wherein the at least one keyword is included in the instant message content; and
identifying a predefined action associated with the at least one keyword, the predefined action defining processing of the Instant Message by the recipient system Instant Message client.

4. The method of claim 3, in which wherein the predefined action comprises displaying the incoming Instant Message to the recipient user of the recipient system based on the at least one keyword even though the recipient system user's Instant Messaging client indicates to a sender of the Instant Message that the recipient user is unavailable.

5. The method of claim 3, in which wherein the predefined action comprises sending the incoming Instant Message to an Instant Message mailbox when the at least one keyword is not found in the instant message content.

6. A non-transitory machine-readable storage medium embodying instructions which, when executed by a machine, causes cause the machine to perform the method of claim 3.

7. The method of claim 1, further comprising:
providing an alert to the recipient user of the recipient system, the alert indicating receipt of the email message with the higher priority.

8. The method of claim 1, further comprising:
receiving a search query indicating one or more keywords; and
accessing the email messages in an email mailbox based on the search query, the email messages including the one or more keywords.

9. The method of claim 3, further comprising:
displaying the Instant Message to the recipient user of the recipient system if the message content includes the at least one keyword.

10. The method of claim 3, further comprising:
providing an alert to the recipient user of the recipient system, the alert indicating receipt of the Instant Message.

11. The method of claim 3, wherein the predefined action indicates a state of an instant messaging client on the recipient system.

12. The method of claim 3, further comprising:
allowing the recipient user of the recipient system to define the predefined action.

13. The method of claim 5, further comprising:
receiving a search query indicating one or more keywords; and
accessing Instant Messages in the Instant Message mailbox based on the search query, the Instant Messages including the one or more keywords.

14. An apparatus comprising:
one or more processors;
one or more memory devices in communication with the one or more processors; and
a network interface in communication with the one or more processors, wherein the one or more memory devices stores executable instructions that, when executed by the one or more processors, cause the one or more processors to:
present a keyword user interface to a recipient user;
receive a new keyword from the recipient user via the keyword user interface;
receive a new action associated with the new keyword, from the recipient user;
store the new keyword and the new action in a profile associated with the recipient user;
receive a plurality of incoming email messages from a message communicator, each email message of the plurality of incoming email messages including message content;
automatically analyze the message content of each email message to identify at least one keyword of a set of keywords that includes the new keyword, wherein the at least one keyword is included in the message content;

prioritize the plurality of incoming email messages based on the at least one keyword to identify a download priority associated with each email message; and selectively download an email message with a higher priority before downloading an email message with a lower priority.

15. The apparatus of claim 14, wherein the executable instructions, when executed by the one or more processors, further cause the one or more processors to:

provide an alert to the recipient user of the recipient system, the alert indicating receipt of the email message with the higher priority.

16. The apparatus of claim 14, wherein the executable instructions, when executed by the one or more processors, further cause the one or more processors to:

receive a search query indicating one or more keywords; and access the email messages in an email mailbox based on the search query, the email messages including the one or more keywords.

\* \* \* \* \*